(12) United States Patent
Zhao et al.

(10) Patent No.: US 12,487,199 B2
(45) Date of Patent: Dec. 2, 2025

(54) EXPERIMENTAL DEVICE FOR THE THERMAL STABILITY AND RE-IGNITION OF FIRE FOAMS UNDER DIFFERENT HEATING CONDITIONS

(71) Applicant: China University of Mining and Technology (Beijing), Beijing (CN)

(72) Inventors: Jinlong Zhao, Beijing (CN); Zhenqi Hu, Beijing (CN); Haoyuan Li, Beijing (CN); Jianping Zhang, Beijing (CN)

(73) Assignee: China University of Mining and Technology (Beijing), Beijing (CN)

( * ) Notice: Subject to any disclaimer, the term of this patent is extended or adjusted under 35 U.S.C. 154(b) by 0 days.

(21) Appl. No.: 18/907,408

(22) Filed: Oct. 4, 2024

(65) Prior Publication Data
US 2025/0155390 A1    May 15, 2025

(30) Foreign Application Priority Data
Nov. 15, 2023   (CN) .......................... 202311520109.3

(51) Int. Cl.
*G01N 25/00* (2006.01)
*A62D 1/02* (2006.01)

(52) U.S. Cl.
CPC ........... *G01N 25/00* (2013.01); *A62D 1/0071* (2013.01)

(58) Field of Classification Search
None
See application file for complete search history.

(56) References Cited

FOREIGN PATENT DOCUMENTS

CN    109813746 A  *  5/2019
CN    113324725 A     8/2021
(Continued)

OTHER PUBLICATIONS

Huacheng Zhu eta al, Experimental analyses and modeling of pool fires with different ullage heights. Journal of Tsinghua University (Science and Technology) Nov. 3, 2023. pp. 1512-1519, especially teh abstract.
(Continued)

*Primary Examiner* — Erica S Lin
(74) *Attorney, Agent, or Firm* — Hawaii Patent Services; Nathaniel K. Fedde; Kenton N. Fedde (57) ABSTRACT

The present invention discloses the development and application of an experimental device for the thermal stability and re-ignition of fire foams under different heating conditions. This device comprises a rectangular mounting module, a radiation module, a convection module, a supply module, a foam injection module, a measurement module and an intelligent control module as shown in FIG. 1: (i) the rectangular mounting module is used to load the oil and foam; (ii) the radiation module simulates the effects of radiative heat flux, whereas the convection module simulated the effects of convective heat flux by a fire plume; (iii) the supply module is used to supply water and oil; (iv) the foam injection module is used to generate and inject foam to the rectangular mounting module; and (v) the measurement module is used to monitor the internal temperature and heat flow parameters of the rectangular mounting module in real time, and to record the foam layer failure time and the flame re-ignition process and finally (vi) the intelligent control module controls all the other modules for any test condition. The present invention can be used not only to demonstrate the collapse process of the foam layer and the re-ignition process, but to provide guidance for improving foam stabil-
(Continued)

ity under the coupled effect of convective heat flux and radiative heat flux in practical fire scenarios.

10 Claims, 4 Drawing Sheets

(56) References Cited

FOREIGN PATENT DOCUMENTS

| | | |
|---|---|---|
| CN | 115792084 A | 3/2023 |
| CN | 116399896 A | 7/2023 |

OTHER PUBLICATIONS

Tao Chen, et al Experimental study on the extinguishing efficiency of compressed air foam sprinkler system on oil pool fire. Procedia Engineering. Dec. 31, 2018. pp. 94-103.

\* cited by examiner

EXPERIMENTAL DEVICE FOR THE THERMAL STABILITY AND RE-IGNITION OF FIRE FOAMS UNDER DIFFERENT HEATING CONDITIONS

TECHNICAL FIELD

The present invention relates to the technical field of a foam performance testing, in particular to an experimental device for the thermal stability and re-ignition of fire foams under different heating conditions.

BACKGROUND

In China, the petrochemical industry is vital to its economic development and the demand for all types of liquid fuels is increasing. In order to meet the demand, many large storage tanks have been built and a large number of oil products have been stored in China. In case of tank fires, the burning area is large, and the flame temperature is high. The burning process generates strong convective and radiative heat. Due to the characteristics mentioned above, firefighting and rescue in large storage tank fire accidents is difficult, which is one of the recognized problems in the world. After a tank fire occurs, foam is typically used for extinguishing the flames. Fire suppression efficiency of foam mainly depends on the flow and coverage of the fuel burning surface, which means that the foam can stably cover the fuel burning surface directly determines the effectiveness of fire suppression. During the development of foam, its thermal stability is a key parameter for evaluating fire extinguishing and re-ignition prevention capabilities. The better the thermal stability, the slower the destruction rate of the foam in the fire scenarios, allowing more foam to cover the oil and thus ensuring fire suppression. In actual fire suppression processes, the foam is affected by both flame radiation and strong convection near the fuel surface. Therefore, it is of great significance to develop a device that can simultaneously simulate the thermal stability of foam under the coupled effects of radiation and convection as commonly observed in practical heating scenarios, as well as dynamically displaying the entire process of foam layer destruction and liquid re-ignition.

SUMMARY

The present invention is focused on the development and application of an experimental device for cauterizing the thermal stability and re-ignition of fire foams under different heating conditions, which has not been done in the past. The device can not only better replicate the heating conditions of the foam layer in fire scenarios and simulate the entire process of foam layer destruction and flame re-ignition, but also quantitatively measures the temperature and heat flow inside the rectangular mounting module under different heating conditions. This can enhance understanding of fire disaster patterns under the coupled effects of radiative heat flux and convective heat flux and provide technical support for measuring the thermal stability of foam. To achieve the above objective, the present invention provides the following solution.

The present invention provides an experimental device for the thermal stability and re-ignition of fire foams under different heating conditions, comprising a rectangular mounting module, a radiation module, a convection module, a supply module, a foam injection module, a measurement module and an intelligent control module. The rectangular mounting module is used to simulate and demonstrate the foam layer destruction and flame re-ignition processes. A quartz glass is installed on the side of container for observation. The radiation module can move up and down as well as left and right, applying different levels of radiative heat flux to the inside of the container to simulate the radiative heat flux received by foam in actual fire scenarios. The convection module can continuously supply a combustible gas with a variable gas supply rate (hence heat release rate) to the rectifying device and apply convective heat flux to the interior of the container, simulating the convective heat flux received by foam in actual fire scenarios. The supply module is used to provide water and oil to the container. The foam injection module is used to generate and spray foam. The measurement module is used to monitor and record the temperature, heat flux, foam layer destruction process and the changes in flame morphology and flame height inside the container. The intelligent control module is used to control all the other modules.

In accordance with an experimental device for the thermal stability and re-ignition of fire foams under different heating conditions of the present invention, wherein the rectangular mounting module comprises a container, a drain valve and a iron mesh. The container is used to hold water, oil and foam. The front of the container is made of quartz glass for observing the foam and flame shapes. The other sides and bottom of the container are made of steel plates, and the size of the container can also be adjusted to simulate different scales of foam layer destruction, flame re-ignition process. The drain valve is located at the bottom of the container to discharge waste liquid. The iron mesh is positioned at the left side of the container to prevent foam from entering the convection module through while allowing the flames to pass through.

Preferably, the front of the containment container can be made of quartz glass for observing the foam and flame shapes. The other sides and bottom can be made of steel plates, and the size of the container can be adjusted to simulate different scales of foam layer destruction, flame re-ignition process.

Preferably, the drain valve can discharge waste liquid after the test to prevent accumulation in the container.

Preferably, the iron mesh is located at the left side of the container. Flames can pass through the iron mesh, while foam cannot flow through. The iron mesh prevents foam from entering the convection module.

In accordance with an experimental device for the thermal stability and re-ignition of fire foams under different heating conditions of the present invention, wherein the convection module is located on the left side of the rectangular containment module to generate flames and simulate the destruction of foam inside the container under the influence of convective heat flux. The convection module comprises a combustible gas cylinder, a pressure reducing valve, a mass flow controller, a gas delivery pipeline and a rectifying device. The combustible gas cylinder is used to provide combustible gas. The pressure reducing valve is installed on the combustible gas cylinder to control the output rate of combustible gas. The gas delivery pipeline is connected at one end to the combustible gas cylinder and at the other end to the rectifying device, for transporting combustible gas. The mass flow controller is installed on the gas delivery pipeline. The rectifying device is connected to the gas delivery pipeline and filled internally with fine particles, ensuring uniform and stable flow velocity of the combustible gas output. After ignition, a stable flame is produced above the rectifying device, thereby generating stable convective heat flux. The convection module is controlled by the intelligent control module, allowing precise adjustment of the output flow rate of the combustible gas, so that the heat release rate can be controlled to simulate the different convective heat flux levels in actual fire scenarios.

Preferably, the combustible gas cylinder can be filled with combustible gas of different calorific value to meet the needs of different convection intensities.

Preferably, the rectifying device can be filled with fine particles such as glass beads and quartz sand.

In accordance with an experimental device for the thermal stability and re-ignition of fire foams under different heating conditions of the present invention, wherein the radiation module is located above the rectangular mounting module. The radiation module can apply different levels of radiative heat flux to the upper part of the rectangular mounting module. The radiation module comprises a radiant panel, a quartz glass panel, a fixture and a motion device. The quartz glass panel is located below the radiant panel to prevent damage to the radiant panel from flames generated inside the rectangular mounting module. The fixture secures the radiant panel and quartz glass panel on the motion device, ensuring that the radiant panel is parallel to the upper surface of the rectangular mounting module. The motion device includes a drive device, a bracket, and a guide rail. The drive device provides power for the movement of the radiation module. The bracket is used to connect and secure the radiant panel and the quartz glass panel. The guide rail enables the radiant panel to move along the longer side of the rectangular mounting module, thereby changing its position for adjustment. Simultaneously, the drive device allows for the vertical movement of the radiant panel, adjusting the distance between the radiant panel and the container to vary the radiative heat flux on the surface of the rectangular mounting module. The radiation module is controlled by the intelligent control module to precisely adjust the radiative heat flux and the position of the radiant panel, so that the radiative heat flux received by the foam layer inside the container can be altered to simulate the variation of radiative heat flux in actual fire scenarios.

Preferably, the radiant panel can utilize heating plates such as infrared radiation plates or gas combustion plates capable of generating thermal radiation, which can be disassembled and replaced according to specific testing requirements.

Preferably, the motion device can move up, down, left, and right according to the specific radiation positioning requirements to ensure that the thermal radiation covers the entire upper surface of the container.

Preferably, the radiation module can be operated independently or simultaneously with the convection module. Thus, the processes of foam destruction and the re-ignition process of the liquid fuels can be simulated under different heating conditions.

Preferably, when the convection module is on while the radiation module is of the destruction process of foam and the re-ignition process of liquid combustion under the scenario of convective heat flux can be simulated; when the convection module is off while the radiation module is on, the destruction process of foam and the re-ignition process of liquid combustion tinder the scenario of radiative heat flux can be simulated; when the convection module and the radiation module is on at the same time, the destruction process of foam and the re-ignition process of liquid combustion under the coupled scenario of convective heat flux and radiative heat flux can be simulated.

In accordance with an experimental device for the thermal stability and re-ignition of fire foams under different heating conditions (convective and/or radiative) of the present invention, wherein the supply module is used to supply water and oil into the container. The supply module comprises a liquid container, a supply pipeline, valves, and a pump. One end of the supply pipeline is connected to the water container and the oil container, and the other end is connected to the container. The valves are located on the supply pipeline. The pump is controlled by the intelligent control module to regulate the liquid supply rate. After opening the valve, the liquid supply rate can be adjusted by controlling the pump power. When the liquid level reaches a pre-determined height, the pump is closed to stop the supply. The supply module is controlled by the intelligent control module. First, the intelligent control module controls the pump to start and begin supplying water. Once the liquid level sensor reaches the pre-determined value, the signal is fed back to the intelligent control module and the water supply is stopped. Subsequently, the intelligent control module controls the pump to start supplying oil. Once the liquid level monitored by the sensor reaches the pre-determined value, the signal is fed back to the intelligent control module and then the oil supply is stopped. Finally, the supply module is used to achieve a specific thickness of water and oil layers inside the container.

Preferably, the type of oil stored in the oil container can be changed. However, it is necessary to ensure that the oil does not mix with water and has a density lower than water.

In accordance with an experimental device for the thermal stability and re-ignition of fire foams under different heating conditions of the present invention, wherein the foam injection module is used to spray foam into the container. The foam injection module comprises a foam generator, a hose, a foam spraying device and a foam baffle. The foam generator is used to produce and store foam. One end of the hose is connected to the foam generator and the other end is connected to the foam spraying device for transporting foam. The foam spraying device is located to the right of the foam baffle. The foam baffle is designed to block the foam sprayed by the foam spraying device and direct the foam into the container to form a foam layer. Firstly, the foam generator produces foam and then sprays out. Subsequently, the foam is blocked by the foam baffle and flows into the container and the thickness of the foam layer gradually increases. Finally, when the liquid level reaches the pre-determined value, the signal is fed back to the intelligent control module to stop the generation and spraying of foam.

Preferably, the foam spraying device can be replaced with a foam injector or other equipment based on the foam preparation process.

Preferably, the diameter and length of the hose can be adjusted based on parameters such as foam expansion ratio and viscosity.

Preferably, the foam baffle is removable. When the foam baffle is used in conjunction with the foam spraying device, the foam baffle can be retained to meet the requirement for a gradual release of foam spraying.

In accordance with an experimental device for the thermal stability and re-ignition of fire foams under different heating conditions of the present invention, wherein the measurement module comprises a liquid level sensor, thermocouples, radiation monitoring devices, and a camera. The liquid level sensor is located inside the container and is used to measure the thickness of the water layer, oil layer, and foam layer. Thermocouples are used to monitor the temperature at the interface between water and oil and between oil and foam. The radiation monitoring device consists of a heat flux meter to measure the radiation heat flux on the foam surface and a quartz glass cover, which is placed over the surface of the heat flux meter to protect the heat flux meter. The camera is used to monitor changes in the foam layer and flame morphology, record results of foam thermal stability tests and simulate the re-ignition processes of the liquid fuel.

Preferably, the thermocouple can be configured along horizontal and vertical directions at different liquid levels to measure the temperatures at various depths and positions.

Preferably, the heat flux meter and the quartz glass cover can be configured along the horizontal direction to obtain heat flux at different positions on the foam surface.

Preferably, the camera can record the changes of foam layer and flame morphology. Depending on environmental brightness and frame rate requirements, the camera can be replaced with a high-speed camera, infrared camera or other suitable options.

In accordance with an experimental device for the thermal stability and re-ignition of fire foams under different heating conditions of the present invention, wherein the intelligent control module is used to control the other modules and adjust experimental parameters in real time: (i) the intelligent control module controls the supply module to supply water and oil into the rectangular mounting module; (ii) the intelligent control module controls the foam injection module to inject foam into the rectangular mounting module; (iii) the intelligent control module selectively operates the convection module and/or radiation module, once the thickness of the foam layer reaches a predetermined value, (iv) the intelligent control module concurrently controls the measurement module to measure and record the temperature, heat flux, and image parameters inside the container and (v) the intelligent control module automates a series of processes including water and oil supply, foam spray and coverage, coupled convective and radiative heat flux effects and real-time recording, thereby simulating the foam destruction process in actual fire scenarios.

BRIEF DESCRIPTION OF THE DRAWINGS

In order to explain the embodiments of the present invention or the technical solutions more clearly, the accompanying drawings in the description of the embodiments or the prior art are briefly introduced below. It is worth noting that the accompanying drawings in the following description are only some of possible embodiments of the present invention. For those of ordinary skill in the art, other drawings can also be obtained according to these accompanying drawings without creative efforts.

Wherein: 100—rectangular mounting module, 110—container, 120—drain valve, 130—iron mesh, 200—convection module, 210—combustible gas cylinder, 220—pressure reducing valve, 230—mass flow controller, 240—gas delivery pipeline, 250—rectifying device, 251—glass bead, 252—quartz sand, 260—flame, 300—radiation module, 310—radiant panel, 320—quartz glass panel, 330—fixture 340—motion device, 341—drive device, 342—bracket, 343—guide rail, 400—supply module, 410—liquid container, 411—water container, 412—oil container, 420—supply pipeline, 430—valves, 440—pump, 500—foam injection module, 510—foam generator, 520—foam spraying device 530—hose, 540—foam baffle, 600—measurement module, 610—thermocouples, 620—radiation monitoring devices, 621—heat flux meter, 622—quartz glass cover, 630—liquid level sensor, 640—camera, 700—intelligent control module.

DETAILED DESCRIPTION

The following clearly and completely describes the technical solutions in the embodiments of the present invention with reference to accompanying drawings. It is worthwhile to note that the described embodiments are merely a part rather than all of the embodiments of the present invention. All other embodiments obtained by a person of ordinary skill in the art based on the embodiments of the present invention without creative efforts shall fall within the protection scope of the present invention.

Embodiments of the present invention are described in detail below, with examples illustrated in the accompanying drawings, wherein the same or similar reference numerals refer to the same or similar elements or elements having the same or similar functions throughout. In the description of the present invention, it should be understood that the orientation or positional relationship indicated by the terms such as "upper", "lower", "front", "rear", "left", "right", "inner", "outer" "vertical" and "circumferential" is based on the orientation or positional relationship shown in the accompanying drawings, and is only for the convenience of describing the present invention and simplifying the description, rather than indicating or implying that the indicated device or element must have a specific orientation or constructed and operated in a specific orientation, and therefore should not be construed as limiting the invention.

To highlight the features and advantages of the present invention, it will be described in further detail below with reference to the accompanying drawings and specific embodiments.

Figure 1:
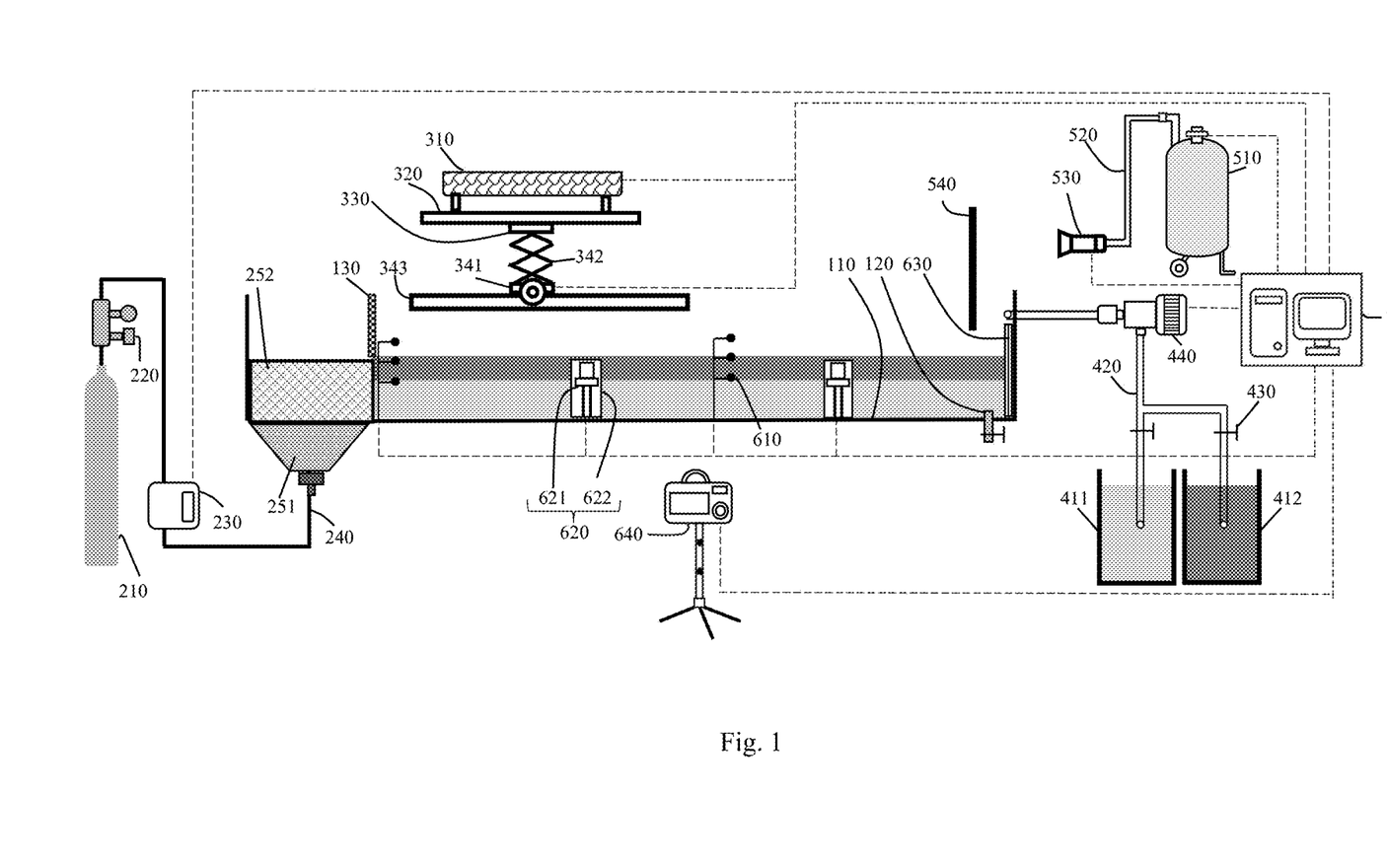
FIG. 1 is an overall structure diagram of an experimental device for the thermal stability and re-ignition of fire foams under different heating conditions of the present invention.

FIG. 1 is an experimental device for the thermal stability and re-ignition of fire foams under different heating conditions of the present invention. As shown in FIG. 1, the embodiment provides the foam thermal stability testing and re-ignition simulation device under the different heat flux, comprising a rectangular mounting module-100, convection module-200, radiation module-300, supply module-400, foam injection module-500, measurement module-600, intelligent control module-700.

Figure 2:
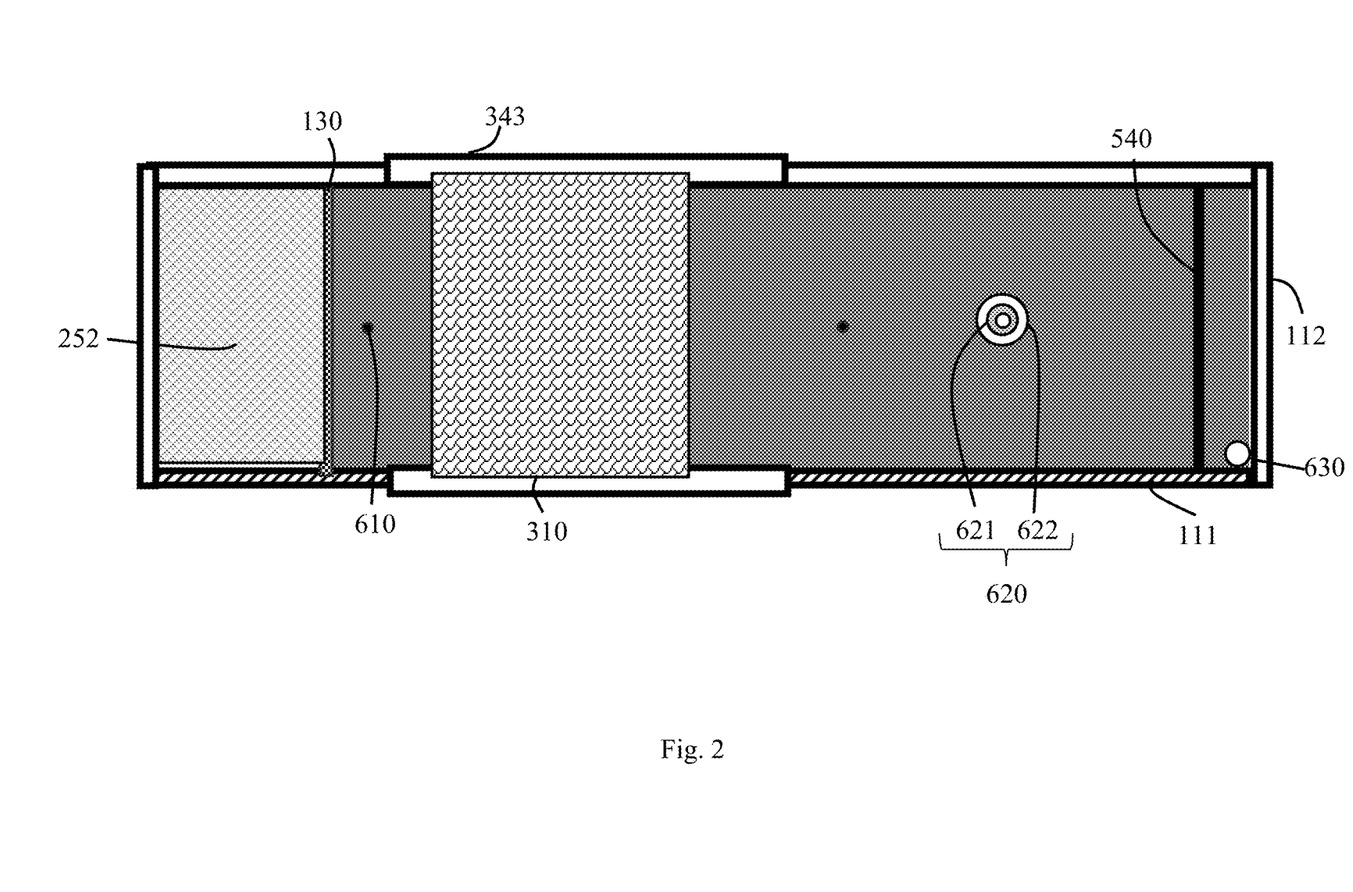
FIG. 2 is a top view of some key structural components of an experimental device for the thermal stability and re-ignition of fire foams under different heating conditions of the present invention.

In the embodiment, as shown in FIG. 1 and FIG. 2, the top of the rectangular mounting module 100 is open. The rectangular mounting module 100 comprises a container 110, a drain valve 120, a iron mesh 130. The container is used to hold water, oil and foam. One side of the container 110 is made of quartz glass plates 111, while the other sides and the bottom of the container are made of steel plates 112. The drain valve 120 is located at the bottom of container 110 and is used for discharging waste liquid. The iron mesh 130 is located on the left side of container 110, which is primarily used to prevent foam from entering the convection module 200. It should be noted that a water layer can form a low-temperature zone at the bottom of container 110, creating a water seal for the bottom of the oil layer, thereby forming a water cushion.

Optionally, the front of container 110 can be made of quartz glass 111, which allows for the observation of foam and flame morphology, while the other sides and the bottom can be made of steel plates 112. The dimensions of the container 110 can be adjusted to simulate the processes of foam layer destruction, re-ignition at different scales.

As shown in FIG. 1 to FIG. 4, the convection module 200 is located on the left side of rectangular mounting module 100, which is primarily used to generate high-temperature flames. The foam inside the left side of rectangular mounting module 100 can be damaged to simulate the destruction of foam under convective heat flux. The convection module 200 comprises a combustible gas cylinder 210, a pressure reducing valve 220, a mass flow controller 230, a gas delivery pipeline 240 and a rectifying device 250. The rectifying device 250 is connected to the gas pipeline 240. The lower part of the rectifying device 250 is filled with glass beads 251 and the upper part is filled with quartz sand 252. The glass beads 251 and the quartz sand 252 respectively fill half of the volume of the rectifying device 250 to ensure uniform and stable flow velocity of the combustible gas output. The combustible gas cylinder 210 is used to supply combustible gas. The pressure reducing valve 220 is installed on the combustible gas cylinder 210 to control the output rate of combustible gas. One end of the gas delivery pipeline 240 is connected to the combustible gas cylinder 210, while the other end is connected to the rectifying device 250, which is used to transport combustible gas. The mass flow controller 230 is installed on the gas pipeline 240. After ignition, a stable flame will be generated above the rectification device 250 to produce stable convection. The convection module 200 is controlled by the intelligent control module 700, allowing precise adjustment of the combustible gas output flow rate. Thus, the heat release rate of the flame 260 can be controlled to simulate different convective heat flux environments in actual fire scenarios.

Optionally, the combustible gas cylinder 210 can hold combustible gases of varying calorific values to meet different convection requirements.

In the embodiment, as shown in FIG. 1 and FIG. 2, the radiation module 300 is positioned above the rectangular mounting module 100 to apply different levels of radiative heat flux. The radiation module 300 is used to test the thermal stability of the foam under the influence of radiative heat flux. The radiation module comprises a radiant panel 310, a quartz glass panel 320, a fixture 330 and a motion device 340. The motion device includes a drive device 341, a bracket 342 and a guide rail 343. The quartz glass panel 320 is located below the radiant panel 310 to prevent the flame 260 generated inside the rectangular mounting module 100 from damaging the radiant panel 310. The fixture 330 secures the radiant panel 310 and quartz glass panel 320 onto the motion device 340 to ensure the radiant panel 310 remains parallel to the rectangular mounting module 100. The drive device 341 provides power for the motion of the radiation module 300. The bracket 342 is used to connect the radiant panel 310 with the quartz glass panel 320. The radiant panel 310 can move along the longer side of the rectangular mounting module 100 to change position of the radiative heat flux based on the guide rail 343. The motion device 340 can also move the radiant panel 310 up and down and adjust the distance between the radiant panel 310 and the container 110 to control the radiative heat flux on the surface of the rectangular mounting module 100. The radiation module 300 is controlled by the intelligent control module 700 to precisely adjust the radiative heat flux and position of the radiant panel 310. Thus, the actual radiation received by the foam layer inside the container 110 can be changed and different radiative heat flux in actual fire scenarios can be simulated.

In the embodiment, as shown in FIG. 1 and FIG. 2, it should be rioted that the destruction of the foam layer will vary depending on the position of the radiant panel 310. When the radiant panel 310 initially starts above the left side of the foam layer and slowly moves to the right, the foam layer shows a destruction trend from left to right. Meanwhile, under the influence of high temperature, the oil will be directly exposed to air and be ignited rapidly. The flame will then spread from left to right along the direction of foam layer destruction until the entire oil surface is covered.

Optionally, the radiant panel 310 can be an infrared radiation plate, a gas combustion plate, or other heating plates capable of generating thermal radiation. The radiant panel 310 can be replaced according to specific testing requirements.

Optionally, the motion device 340 can move up, down, left, and right to meet different radiation position requirements, ensuring that the radiative heat flux can cover the entire upper surface of the container 110.

Figure 3:
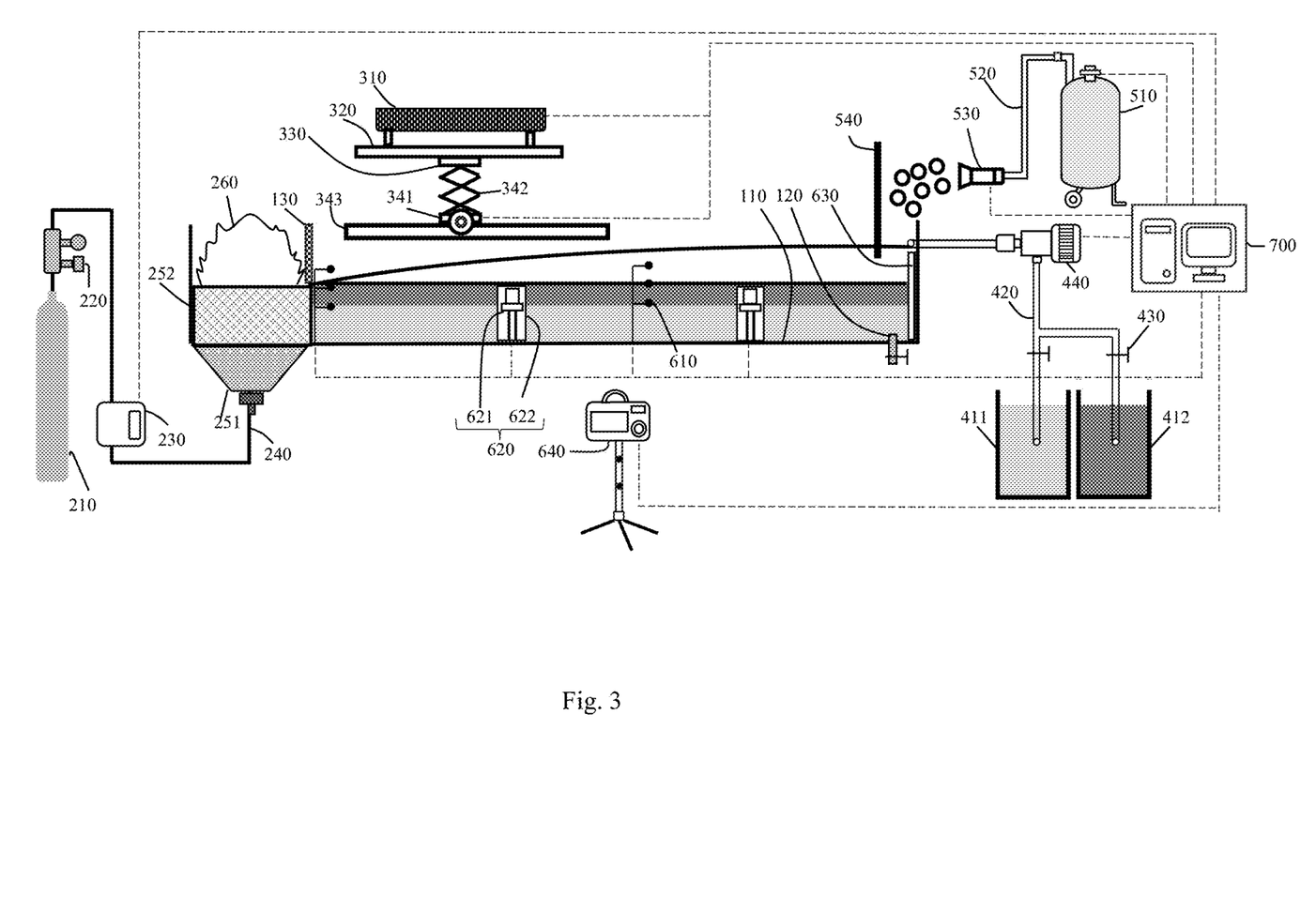
FIG. 3 is an overall structural diagram of an experimental device for the thermal stability and re-ignition of fire foams under different heating conditions after the action of foam injection module, radiation module and convection module of the present invention.
Figure 4:
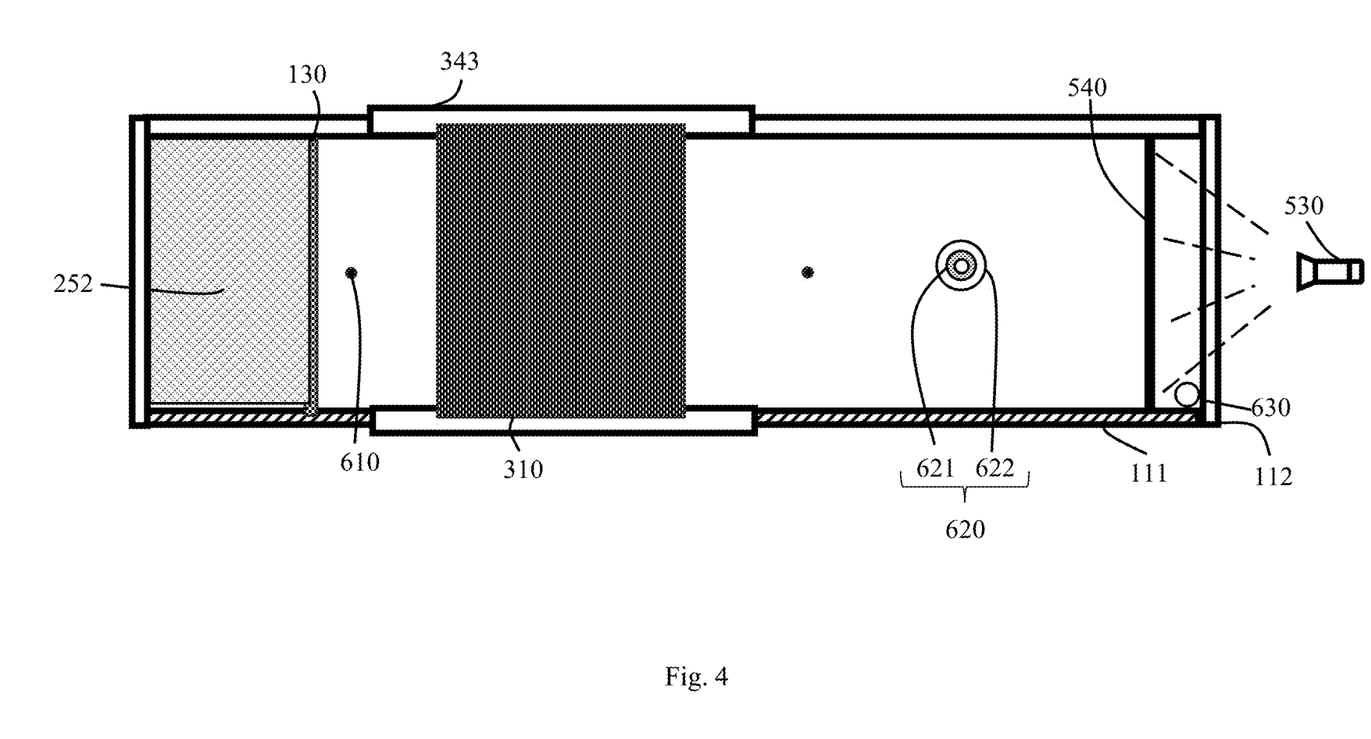
FIG. 4 is a top view of an experimental device for the thermal stability and re-ignition of fire foams under different heating conditions after the action of foam injection module, radiation module and convection module of the present invention.

In some specific embodiments, as shown in FIG. 3 and FIG. 4, after the foam layer has completely covered the oil layer, the convection module 200 and radiation module 300 can operate individually or simultaneously. At this point, the foam layer will be simultaneously affected by the radiative heat flux applied by the radiant panel 310 and the convective heat flux induced by the flame 260. The foam layer destruction rate and flame spread rate will change with the total heat flux received by foam, which can be used to replicate actual fire scenarios.

Optionally, when the convection module 200 is on while the radiation module 300 is off, the destruction process of foam and the re-ignition process of liquid combustion under the scenario of convective heat flux can be simulated; when the convection module 200 is off while the radiation module 300 is on, the destruction process of foam and the re-ignition process of liquid combustion under the scenario of radiative heat flux can be simulated; when the convection module 200 and the radiation module 300 is on at the same time, the destruction process of foam and the re-ignition process of liquid combustion under the coupled scenario of convective heat flux and radiative heat flux can be simulated.

In the embodiment, as shown in FIG. 1 and FIG. 2, the supply module 400 is used to supply water and oil into the container 110. The supply module 400 comprises a liquid container 410, a supply pipeline 420, valves 430 and a pump 440. The liquid container 410 includes a water container 411 and an oil container 412. One end of the supply pipeline 420 is connected to the water container 411 and the oil container 412, while the other end is connected to the container 110. The valves 430 are located on the supply pipeline 420. Pump 440 is controlled by the intelligent control module 700 to regulate the liquid supply rate. After opening the valve 430, the liquid supply rate can be adjusted by controlling the power of the pump 440. When the liquid level reaches the given height, the pump 440 is closed to stop the supply.

In some specific embodiments, as shown in FIG. 1 and FIG. 2, the supply process of the water layer and oil layer is as follows:

First, valves 430 controlled by the intelligent control module 700 is activated to initiate water supply. Once the liquid level sensor 630 reaches the predetermined value, the signal is sent to the intelligent control module 700 to stop the water supply.

Subsequently, pump 430 controlled by the intelligent control module 700 is activated to initiate oil supply. Once the liquid level sensor 630 reaches the predetermined value, the signal is sent to the intelligent control module 700 to stop the oil supply.

Finally, the liquid inside the container 110 will be separated into a water layer and an oil layer of given thicknesses.

Optionally, the type of oil stored in oil container 412 can be changed, but it must ensure that the oil does not mix with water and has a density less than water.

In the embodiment, as shown in FIG. 3 and FIG. 4, the foam injection module 500 is used to inject foam into the container 110. The foam injection module 500 comprises a foam generator 510, a hose 520, a foam spraying device 530 and a foam baffle 540. The foam generator 510 is used to produce and store foam. One end of the hose 520 is connected to the foam generator 510, and the other end is connected to the foam injection device 530 for foam delivery. The foam injection device 530 is located to the right of the foam baffle 540 and is used for foam injection. The foam baffle 540 can block the foam injected from the foam injection device 530 and thus force the foam to flow into the container 110 to form a foam layer. The foam generator 510 and the foam injection device 530 are controlled by the intelligent control module 700.

In some specific embodiments, as shown in FIG. 3 and FIG. 4, the injection process of the foam is as follows:

First, the foam generator 510 produces foam and then sprays out,

Subsequently, the foam is blocked by the foam baffle 540 and flows into the container 110 and the thickness of the foam layer gradually increases.

Finally, when the liquid level sensor 630 reaches the predetermined value, it sends feedback to the intelligent control module 700 to stop the generation and spraying of foam.

Optionally, the diameter and length of the hose 520 can be adjusted based on parameters such as foam expansion ratio and viscosity.

Optionally, the foam injection device 530 can be replaced with a foam injector or other equipment according to the foam preparation process.

Optionally, the foam baffle 540 can be either removable or retained when used with the foam injection device 530 to meet the slow release requirements of foam injection.

In the embodiment, as shown in FIG. 1 and FIG. 3, the measurement module 600 comprises thermocouples 610, radiation monitoring devices 620, liquid level sensor 630, camera 640. The measurement module 600 is used to monitor and record the temperature, heat flux, foam layer morphology and changes in flame shape and flame height within the container 110. The thermocouple 610 is used to monitor the temperature at the interface between water and oil, between oil and foam, and within the foam layer. The radiation monitoring device 620 includes a heat flux meter 621 and a quartz glass cover 622 and is used to measure the magnitude of radiant heat flux at the foam surface. The quartz glass cover 622 is placed over the surface of the heat flux meter 621 to protect it. The liquid level sensor 630 is located inside the container 110 to measure the thickness of the water layer, oil layer, and foam layer. The camera 640 is used to monitor changes in foam layer and flame morphology and to record the results of foam thermal stability tests.

Optionally, the thermocouple 610 can be set up at various horizontal and vertical positions according to different liquid levels to obtain temperatures at different depths anid locations.

Optionally, the heat flux meter 621 and quartz glass cover 622 can be set up at various horizontal positions according to testing requirements to measure heat flux at different locations on the foam surface.

Optionally, Camera 640 that is used to record changes in foam layer and flame morphology can be replaced with a high-speed camera, infrared camera, or other types based on environmental brightness and frame rate requirements.

In the embodiment as shown in FIG. 1 and FIG. 3, the intelligent control module 700 controls the other modules and the intelligent control module 700 is capable of controlling the other modules to switch on or off and adjusting the size of the parameters in real time. Firstly, the intelligent controls the supply module 400 to supply water and oil to the inside of the rectangular mounting module 100. Subsequently, the intelligent control module 700 controls the foam injection module 500 to spray foam to the inside of the rectangular mounting module 100. When the thickness of the foam layer reaches a predetermined value, the convection module 200 and the radiation module 300 can be selectively controlled to switch on or off and the power level, so as to heat the foam layer. During this period, the measurement module 600 is simultaneously controlled to measure and record the temperature, heat flow, and image parameters of the interior of the container 110. A series of intelligent processes of water supply and oil supply, foam covering, convection and radiation coupling action and real-time recording can be realised, so as to simulate the destructive process of foam in the actual fire scene.

An experimental device for the thermal stability and re-ignition of fire foams under different heating conditions of an embodiment of the present invention is described below with reference to the accompanying drawings of the specification.

A method for the thermal stability and re-ignition of fire foams under different heating conditions according to an embodiment of the present invention, comprising the steps of:

1. Before testing, the supply module 400 supplies water and oil into the rectangular mounting module 100. When the liquid level sensor 630 reaches the predetermined value, the supply module stops. Then the water layer and oil layer of given thicknesses are formed.
2. The foam generator 510 produces foam, which is then sprayed and slowly flows down under the influence of the foam baffle 540. When the liquid level sensor 630 reaches the predetermined value, the foam generator 510 stops and a stable foam layer of given thickness forms above the oil layer.
3. The flame 260 generated by the convection module 200 is used to simulate thermal convection, while the radiant panel 310 simulates radiative heat flux. The convection module 200 and radiation module 300 can operate separately or simultaneously. Depending on the testing requirements, the convective heat flux and radiative heat flux can be adjusted to predetermined values. The foam destruction of the foam layer and reignition process of flame under convective heat flux, radiative heat flux, or coupled scenario of convective heat flux and radiative heat flux can be simulated.
4. The intelligent control module 700 activates the liquid level gauge 630, thermocouple 610, radiation monitoring device 620, and camera 640 to record the data including liquid level, temperature, heat flux, and flame characteristics. The data will be continuously fed back to the intelligent control module 700 to enable real-time control over the water layer, oil layer, and foam layer. Simultaneously, the measurement module 600 also records foam destruction time and flame spread rate parameters to assess foam stability and the re-ignition process.
5. After the measurements are completed, waste liquid is discharged through the drain valve 120.

In the description of this invention, it should be noted that unless otherwise specified and limited, terms like "installation" and "connection" are to be broadly understood. For example, they can denote fixed, detachable, or integral connections, and involve both mechanical and electrical connections. Ordinary technical professionals in this field can interpret these terms based on specific circumstances within the context of the invention.

Several examples are used for illustration of the principles and implementation methods of the specification. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:

1. An experimental device for the thermal stability and re-ignition of fire foams under different heating conditions, comprising a rectangular mounting module, a convection module, a radiation module, a liquid supply module, a foam injection module, a measurement module and an intelligent control module;

the rectangular mounting module is open at the top and comprises a container, a drain valve and an iron mesh; the container is used to contain water, oil and foam; the drain valve is located at the bottom of the container and is used to discharge waste liquid; the iron mesh is located on the left side of the container and is used to prevent foam from entering the convection module;

the convection module is located on one end of the rectangular mounting module and is used to generate a high-temperature flames, the convection module applies convective heat flux to the foam inside the rectangular mounting module, causing degradation of the foam; the convection module generates convective heat flux, which simulates the destruction process of the foam under the influence of convective heat flux; the convection module comprises a combustible gas cylinder, a pressure reducing valve, a mass flow controller, a gas delivery pipeline and a rectifying device; the combustible gas cylinder is used to provide combustible gas; the pressure reducing valve is installed on the combustible gas cylinder to control the output rate of combustible gas; the gas delivery pipeline is connected at one end to the combustible gas cylinder and at the other end to the rectifying device for transporting combustible gas; the mass flow controller is installed on the gas delivery pipeline; the rectifying device is connected to the gas delivery pipeline and filled internally with fine particles, ensuring the uniform and stable flow rate of the combustible gas output; a stable flame is produced above the rectifying device after ignition and then the stable thermal convection is generated;

the radiation module is located above the rectangular mounting module; the radiation module is used to apply different degrees of thermal radiation to the upper part of the rectangular mounting module and the thermal stability of the foam can be tested under the influence of the thermal radiation; the radiation module comprises a radiant panel, a quartz glass panel, a fixture and a motion device; the quartz glass panel is located below the radiant panel to prevent flame generated by the internal combustion of the rectangular mounting module from damaging the radiant panel; the fixture secures the radiant panel and the quartz glass panel on the motion device to ensure the radiation panel moves parallel to the upper surface of the rectangular mounting module; the motion device comprises a drive device, a bracket, and a guide rail; the drive device provides power for the movement of the radiation module; the bracket is used to connect and secure the radiant panel and quartz glass panel; the guide rail enables the movement of the radiant panel along the longer side of the rectangular mounting module, thereby changing its radiation position; simultaneously, the drive device allows vertical movement of the radiant panel, adjusting the distance between the radiant panel and the container to vary the radiation size on the surface of the rectangular mounting module; the convection module and radiation module can operate together to simulate a coupled effect of convective heat flux and radiative heat flux on the foam, in practical fire scenarios, affecting the thermal stability and re-ignition of the foam;

the liquid supply module is used to supply water and oil into the container; the liquid supply module comprises a liquid container, a liquid supply pipeline, a valve, and a pump; one end of the liquid supply pipeline is connected to the water container and oil container, and the other end is connected to the container; the valve is located on the liquid supply pipeline; the pump is controlled by the intelligent control module to regulate the liquid supply rate; after opening the valve, the liquid supply rate can be adjusted by regulating the pump power; when the liquid level reaches the given height, the pump is then closed to stop the liquid supply;

the foam injection module is used to spray foam into the container; the foam injection module comprises a foam generator, a hose, a foam spraying device and a foam baffle; the foam generator is used to produce and store foam; one end of the hose is connected to the foam generator, while the other end is connected to the foam spraying device to transport foam; the foam spraying device is positioned to the right of the foam baffle and is used to spray foam; the foam baffle is used to block the sprayed foam by the foam spraying device and direct the foam into the container, thereby forming a stable foam layer;

the measurement module comprises a liquid level sensor, thermocouple, radiation monitoring device, and a camera, which are used to monitor and record the liquid layer thickness, temperature, heat flow, foam; layer shape and flame shape and height changes in the container;

the intelligent control module utilizes the parameters from the measurement module to control the liquid supply module, foam injection module, convection module, and radiation module; the intelligent control module can simulates the destruction process of foam layer under radiation, convection and combined effect of convective heat flux and radiative heat flux, thereby determining the stability of the foam and realizing the dynamic display of the liquid re-ignition process.

2. An experimental device for the thermal stability and re-ignition of fire foams under different heating conditions according to claim 1, wherein the top of the rectangular mounting module is open; one side of the container is made of quartz glass to observe the morphology of foam and flames, while the other sides and bottom of the container are made of steel plates.

3. An experimental device for the thermal stability and re-ignition of fire foams under different heating conditions according to claim 1, wherein the convection module is controlled by the intelligent control module so that the output rate of the combustible gas can be precisely adjusted, thereby controlling the heat release rate of the flame to simulate the different convective heat flux in the practical fire scenarios.

4. An experimental device for the thermal stability and re-ignition of fire foams under different heating conditions according to claim 1, wherein the radiation module is controlled by the intelligent control module to accurately control the radiative heat flux and position of radiant panel, so as to change the radiative heat flux of the upper foam layer and simulate the radiative heat flux in the practical fire scenarios.

5. An experimental device for the thermal stability and re-ignition of fire foams under different heating conditions according to claim 1, wherein supply module is controlled by the intelligent control module; first, the intelligent control module controls the pump to open and start the water supply, while the liquid level sensor reaches a predetermined value, the signal will be fed back to the intelligent control module and the water supply will be stopped; then, the intelligent control module controls the pump to open and start the oil supply, while the liquid level sensor reaches a predetermined value, the signal will be fed back to the intelligent control module and the oil supply will be stopped; finally, the internal liquid in the container is divided into a given thickness of the water layer and the oil layer.

6. An experimental device for the thermal stability and re-ignition of fire foams under different heating conditions according to claim 1, wherein the foam generator and the foam spraying device are controlled by the intelligent control module; first, the foam generator generates foam and the foam spraying device sprayed the foam out; then the foam is blocked by the foam baffle and flows into the container; finally, when the foam thickness gradually increases and the liquid level sensor reaches a predetermined value, the signal will be fed back to the intelligent control module to stop generating foam.

7. An experimental device for the thermal stability and re-ignition of fire foams under different heating conditions according to claim 1, wherein the camera is used to monitor changes in the foam layer and flame morphology, record foam thermal stability test results, and simulate combustion re-ignition processes; the liquid level sensor is located inside container and is used to measure the thickness of the water, oil and foam layers; the thermocouples are used to monitor the water-oil interface temperature, the oil-foam interface temperature, and the internal temperature of the foam layer, thereby characterizing the foam destruction rate; the radiation monitoring device comprises a heat flux meter and a quartz glass cover; the heat flux meter is used for measuring the radiation heat flux at the surface of the foam, the quartz glass cover is covered on the surface of heat flux meter to protect the heat flux meter.

8. An experimental device for the thermal stability and re-ignition of fire foams under different heating conditions according to claim 1, wherein the intelligent control module can control the other modules and adjust the parameters in real time; first, the intelligent control module controls supply nodule to supply water and oil to the rectangular mounting module; subsequently, foam injection module is controlled to inject foam into the rectangular mounting module; when the thickness of the foam layer reaches a predetermined value, the convection module and radiation module can be selectively controlled to switch on and off with the power level to heat the foam layer, during which the measurement module is simultaneously controlled to measure and record the temperature, heat flow and images inside the container; the intelligent control module can realize a series of intelligent processes of water supply and oil supply, foam covering, coupled effect of convective heat flux and radiative heat flux and real-time recording, so as to simulate the destruction process of foam in the practical fire scenarios.

9. An experimental device for the thermal stability and re-ignition of fire foams under different heating conditions according to claim 1, wherein convection module and radiation module can be turned on individually or at the same time; when the convection module is on while the radiation module is off the destruction process of foam and the re-ignition process of liquid combustion under the scenario of convective heat flux can be simulated; when the convection module is off while the radiation module is on, the destruction process of foam and the re-ignition process of liquid combustion under the scenario of radiative heat flux can be simulated; when the convection module and the radiation module is on at the same time, the destruction process of foam and the re-ignition process of liquid combustion under the coupled scenario of convective heat flux and radiative heat flux can be simulated; by adjusting the ratios of convective heat flux from the convection module and radiative heat flux from the radiation module to the rectangular mounting module, the heating environment of the foam can be simulated under various fire scenarios.

10. An experimental device for the thermal stability and re-ignition of fire foams under different heating conditions according to claim 1, the process comprises:
   S1: before the test, the supply module supplies water and oil to the rectangular mounting module, forming a water layer and an oil layer of a-given thicknesses;
   S2: the foam injection module injects foam to form a stabilized foam layer of a given thickness above the oil layer;
   S3: the convection module and radiation module operate individually or simultaneously to apply thermal convection and thermal radiation to the foam layer to simulate the destruction process of the foam layer under convective heat flux, radiative heat flux and coupled scenario of convective heat flux and radiative heat flux and the process of re-ignition;
   S4: the measurement module monitors the liquid level height, temperature, heat flow and flame data in real time and feeds back to the intelligent control module to realize the control of the water, oil and foam layers; while the measurement module also records the parameters of the foam destroying time and the flame spreading rate, which are used to assess the foam stability and the combustion re-ignition process;

S5: after the measurement, the waste liquid is discharged through the drain valve.

* * * * *